United States Patent [19]

Sasaki

[11] Patent Number: 5,268,992
[45] Date of Patent: Dec. 7, 1993

[54] PRINTER FOR PRINTING CHARACTERS MADE UP OF FIRST COLOR OUTLINE AND SECOND COLOR FILL

[75] Inventor: Ichiro Sasaki, Chita, Japan

[73] Assignee: Brother Kogyo Kabushiki Kaisha, Nagoya, Japan

[21] Appl. No.: 822,658

[22] Filed: Jan. 21, 1992

[30] Foreign Application Priority Data

Jan. 21, 1991 [JP] Japan ................................ 3-5354

[51] Int. Cl.$^5$ ............................................ G06K 15/00
[52] U.S. Cl. ................................. 395/110; 395/109
[58] Field of Search ............... 395/109, 110, 114, 115, 395/116, 131, 141, 150, 164–166, 103; 346/154, 157, 108; 358/78, 404, 444; 340/730, 750, 798, 799, 701

[56] References Cited

U.S. PATENT DOCUMENTS 4,321,610 3/1982 Moore et al. ...................... 346/308
5,081,584 1/1992 Horsley ............................. 395/150

Primary Examiner—Arthur G. Evans
Attorney, Agent, or Firm—Oliff & Berridge

[57] ABSTRACT

To provide a printer which reduces a waiting time when each character is to be printed with two colors, and hence which can operate highly efficiently for the user. When a command for specifying a first color is received from a host computer, the specified color is stored in a first color storage area. When a command for specifying a second color is received from the host computer, the specified color is stored in a second color storage area. When character data are received, if the drawing method indicates the filling of the character specified by the character data, then the character is filled with the first color, and if the drawing method indicates the outlining of the character, then the character is outlined with the second color.

8 Claims, 4 Drawing Sheets

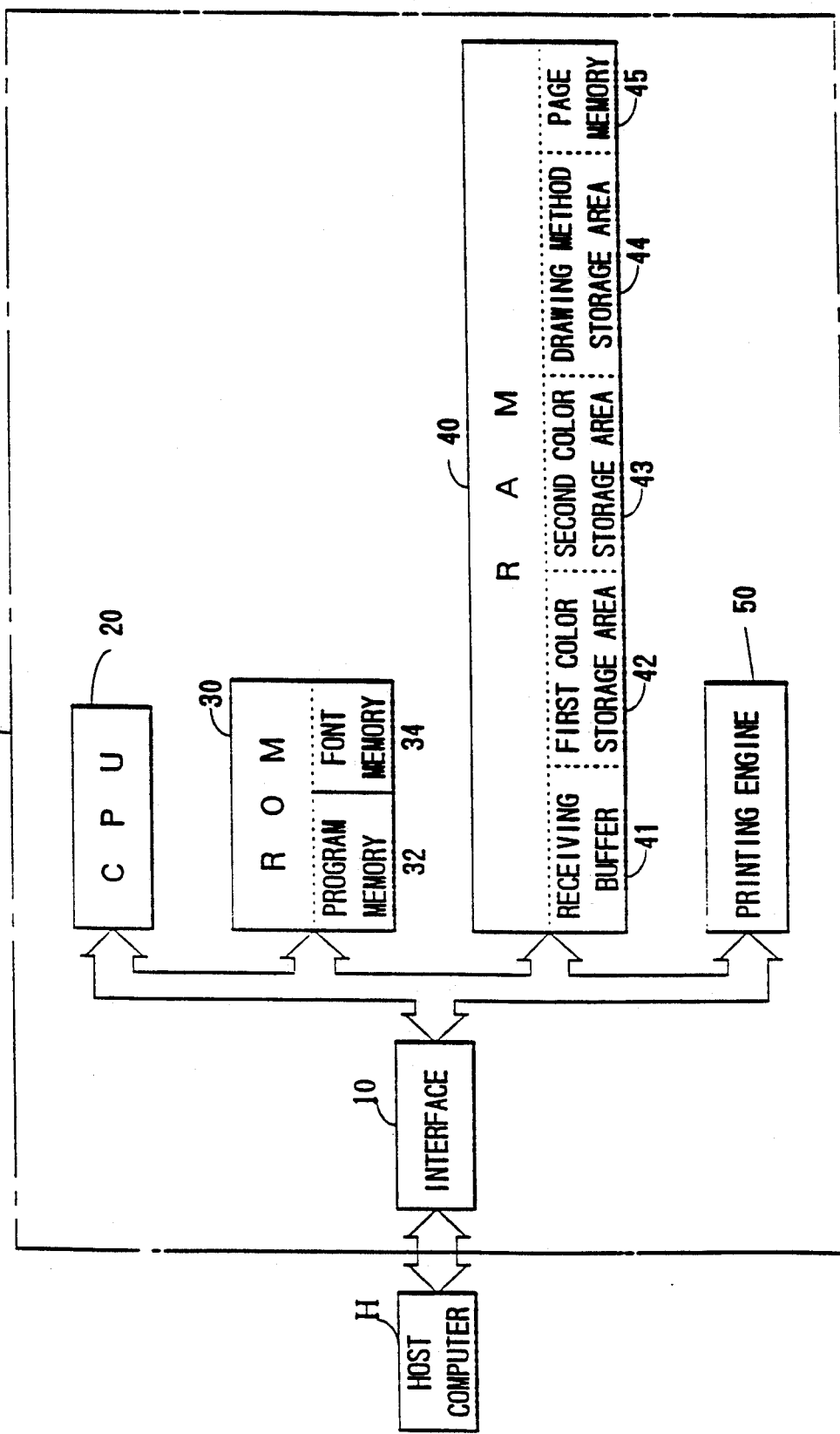

FIG. 3A    FIG. 3B    FIG. 3C
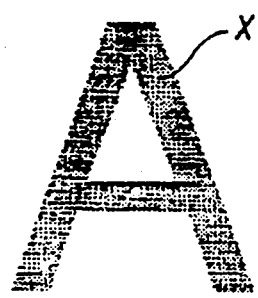
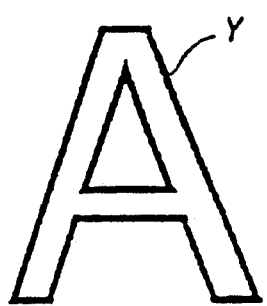
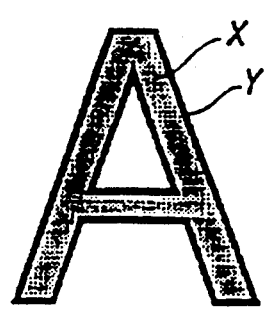
FIG. 5A    FIG. 5B
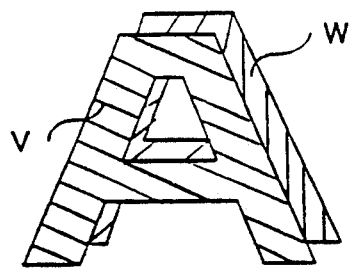
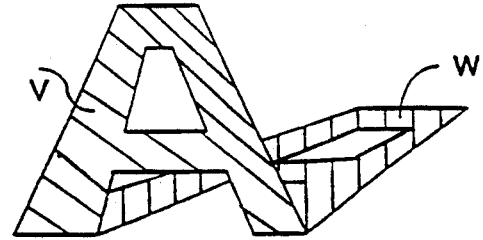

PRINTER FOR PRINTING CHARACTERS MADE UP OF FIRST COLOR OUTLINE AND SECOND COLOR FILL

BACKGROUND OF THE INVENTION

The present invention relates to a printer, and more particularly to a printer connected to a host computer, for printing character shapes stored therein on a print medium based on print data from the host computer.

Some known printers are capable of printing not only characters of given shapes on printing sheets, but also the outlines Y for characters (hereinafter referred to as outline characters), as shown in FIG. 3B, and the outlines Y and fills X for characters (hereinafter referred to as filled outline characters) in different colors, as shown in FIG. 3C. To print a character in a desired color with such a printer, the printer prints the characters based only on a command for setting the color and a command for drawing the character, the commands being inputted from a host computer. A filled outline character is printed by the printer based on the commands according to the following sequence comprising the steps of: (a) establishing the color of the fill of a character, (b) specifying the character, (c) filing in a memory the character, (d) establishing the color of the outline of the character, (e) specifying the character the same character as specified in (b), and (f) outlining the character in a memory.

The data required to draw the filled outline character is thus prepared according to the above steps. These steps are repeated to generate one page of data to draw desired filled outline characters. Based on the generated data, the desired filled outline characters are printed on a printing sheet.

The printer, however, requires a long processing time as it carries out the above data processing for each character. Since the amount of data transmitted from the host computer to the printer is increased, the time required for the host computer to transmit the data to the printer is very long. For example, if ten filled outline characters as shown in FIG. 3C are to be printed in red for the fill X and black for the outline Y, then the colors must be established, the characters must be specified, and the characters must be filled and outlined, each for 20 times even if the characters are identical. More specifically, the colors must be changed from red to black to red . . . for 20 times, during which time the data indicative of the character ("A" in this case) are read 20 times.

Therefore, the print waiting time after the host computer starts transmitting the data until the characters are actually printed is quite long, resulting in a waste of time for the user. The efficiency with which the work is done by the printer for the user is low. Since the printer does not operate efficiently for the user, filled outline characters that can give printed documents an attractive appearance have not been fully utilized so far.

SUMMARY OF THE INVENTION

In view of the aforesaid drawbacks of the conventional printers, it is an object of the present invention to provide a printer which can print characters in two colors within a reduced print waiting time, and hence can operate efficiently for the user.

According to the present invention, there is provided a printer, as shown in FIG. 1, which includes print data inputting means which receives print data specifying at least a character. There is provided shape memory means which stores first and second character shapes for the character. The first and second character shapes are correlated to each other. For example, the first character shape is an outline of the character, and the second character is an inner portion defined by the outline of the character. Shape reading means reads the first and second character shapes for the character specified by the print data out of said shape memory means. There are provided first color storage means for storing a first color, and second color storage means for storing a second color. There are further provided first drawing data generating means which generates first drawing data indicative of the first character shape drawn with the first color stored in said first color storage means, and second drawing data generating means which generates second drawing data indicative of the second character shape drawn with the second color stored in said second color storage means. Print control means prints the character on a recording medium based on at least one of said first drawing data and said second drawing data.

More specifically, the shape memory means stores first and second character shapes for a character. When print data specifying a character are inputted to the print data inputting means, the shape reading means reads the first and second character shapes for the character specified by the inputted print data, from the shape memory means. The first drawing data generating means generates first drawing data indicative of the read first character shape drawn with the first color stored by the first color storage means, and the second drawing data generating means generates second drawing data indicative of the read second character shape drawn with the second color stored by the second color storage means. The print control means prints the character based on at least one of the first drawing data and the second drawing data.

The first and second character shapes and the first and second colors are correlated to each other such that the first character shape is drawn with the first color and the second character shape with the second color. Therefore, it is not necessary to repeat the setting of colors for each character to be printed.

The data to be stored by the first and second color storage means may not represent colors, but tints by way of dot densities. The data to be stored by the shape memory means may be formulas for calculating two character shapes from one character shape.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a block diagram showing an arrangement of a printer according to an embodiment of the present invention;

FIGS. 3A, 3B, and 3C are diagrams showing character shapes;

FIGS. 5A and 5B are diagrams showing modified character shapes.

DETAILED DESCRIPTION OF THE PREFERRED EMBODIMENT

Figure 1:
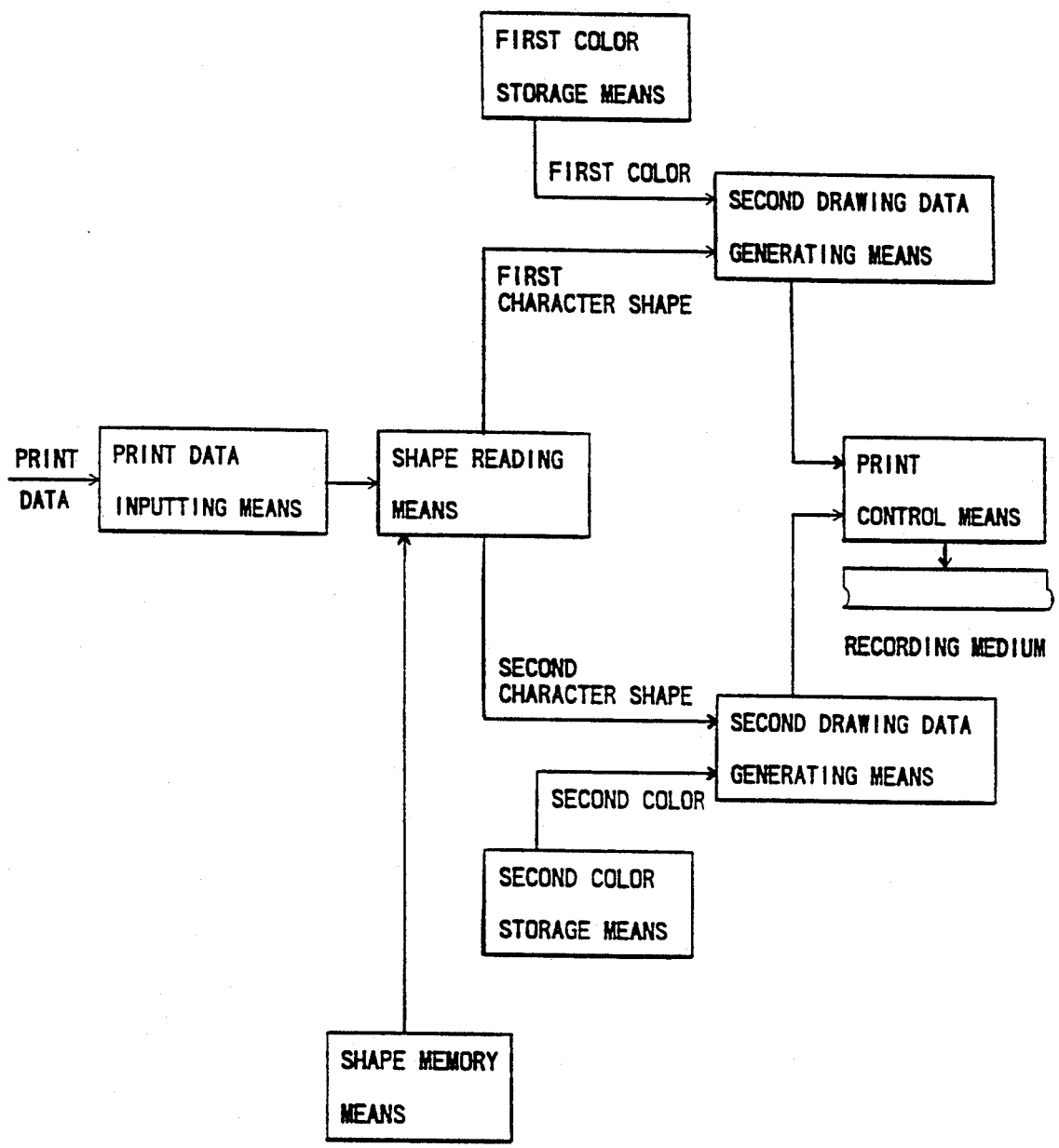
FIG. 1 is a block diagram showing a basic arrangement of the present invention.

To clarify the arrangement and operation of the present invention as referred to above, a preferred embodiment of the present invention will hereinafter be described with reference to the drawings.

FIG. 2 schematically shows a printer according to the present invention, the printer being in the form of a laser beam printer in the illustrated embodiment.

The printer, generally designated by the reference numeral 1, is connected to a host computer H. When supplied with print data from the host computer H, the printer 1 prints an image which may be characters, symbols, graphics, or the like, on a printing sheet based on the supplied print data. The printer 1 comprises an interface 10, a CPU 20, a ROM 30, a RAM 40, a printing engine 50, and a bus 60 interconnecting the input-/output interface 10, the CPU 20, the ROM 30, the RAM 40, and the printing engine 50. The interface 10 is connected to the host computer H. The interface 10 is in the form of an input/output circuit having an input circuit which receives print data composed of character data and various control data from the host computer H, and an output circuit which outputs control signals. The CPU 20 is a known arithmetic logic unit, and controls the printer 1 in its entirety according to various control routines.

The ROM 30 includes a program memory 32 for storing a program required for the CPU 20 to effect various controlling operations, and a font memory 34 for storing font data indicative of character shapes. The character shapes stored in the font memory 34 include normal character shapes with fills X as shown in FIG. 3A, and outline character shapes indicating only the outlines Y for characters as shown in FIG. 3B. The ROM 30 may store, instead of the font data of outline character shapes, formulae for calculating outline character shapes from normal character shapes.

The RAM 40 includes a receiving buffer 41, a first color storage area 42, a second color storage area 43, a drawing method storage area 44, and a page memory 45 for storing one page of drawing data, these areas and memory serving as work areas used by the CPU 20 for data processing for temporarily storing calculated data.

The printing engine 50, responsive to an end-of-page command, receives one page of drawing data stored in the page memory 45, and turns on and off a laser beam based on the drawing data. The printing engine 50 includes a sheet feed system, an image forming system, a laser/scanner system, and a control system (all not shown).

Figure 4:
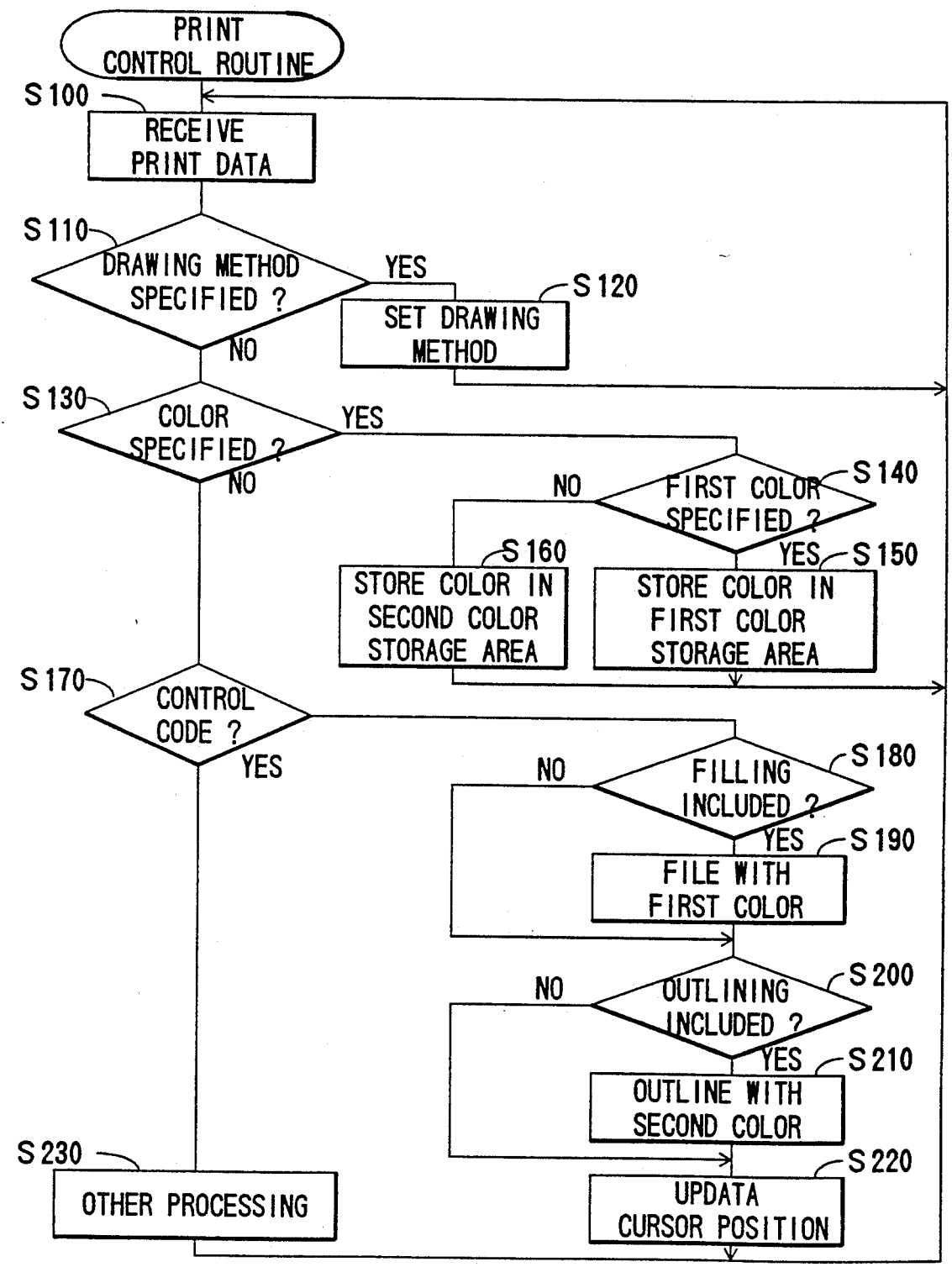
FIG. 4 is a flow chart illustrating a print control routine for the printer.

A print control process carried out by the printer 1 will be described with reference to a print control routine shown in FIG. 4. The print control routine starts when the power supply of the printer 1 is tuned on. When the print control routine is started, the printer is initialized to establish a character size, a printing direction, a cursor position, etc.

The printer 1 receives print data from the host computer H in a step S100. Then, a step S110 determines whether the received print data are a command for specifying a drawing method or not. Specifically, the print data received from the host computer H are temporarily stored in the receiving buffer 41, and the CPU 20 determines whether the print data read from the receiving buffer 41 are a command for specifying a drawing method or not.

If the print data are a command for specifying a drawing method, then a drawing method is stored in the drawing method storage area 44 in a step S120. According to the illustrated embodiment, there are three drawing methods or patterns including a method of drawing a normal character as shown in FIG. 3A, a method of drawing an outline character as shown in FIG. 3B, and a method of drawing a filled outline character as shown in FIG. 3C. The drawing method storage area 44 is a 2-bit memory with a low-order bit indicating a fill X for a character, and a high-order bit indicating an outline Y for a character. When the printer is initialized, the drawing method storage area 44 is set to "01" for the fill X (normal character drawing). If the command for specifying a drawing method from the host computer H indicates the drawing of an outline character, then the drawing method storage area 44 is set to "10", and if the command for specifying a drawing method from the host computer H indicates the drawing of a filled outline character, then the drawing method storage area 44 is set to "11". After the step S120, control goes back to the step S100.

If the read print data are not a command for specifying a drawing method in the step S110, then a step S130 determines whether the print data are a command for specifying a color or not. If the print data are a command for specifying a color, then a step S140 determines whether the command specifies a first color or not. If the command specifies a first color, then the specified color is stored in the first color storage area 42 in a step S150. If the command does not specifies a first color, i.e., if the command specifies a second color, then the specified color is stored in the second color storage area 43 in a step S160. Control returns from the step S150 or S160 back to the step S100.

If the read print data are not a command for specifying a color in the step S130, then a step S170 determines whether the print data are another control code or not. If the print data are not a control code, i.e., if the print data are character data indicative of a character, then a step S180 determines whether the drawing method for the character includes the drawing of a fill X for the character or not, by referring to the drawing method storage area 44, i.e., the step S180 determines whether the low-order bit of the drawing method storage area 44 is "1" or not. If the low-order bit of the drawing method storage area 44 is "1", then the fill X for the character specified by the character data is drawn with the first color in the page memory 45 by referring to the color information stored in the first color storage area 42 in a step S190. If the low-order bit is "0", then the step S190 is skipped, and control jumps from the step S180 to a step S200.

The step S200 determines whether the drawing method for the character includes the drawing of an outline Y for the character or not, by referring to the drawing method storage area 44, i.e., the step S200 determines whether the high-order bit of the drawing method storage area 44 is "1" or not. If the high-order bit of the drawing method storage area 44 is "1", then the outline Y for the character specified by the character data is drawn with the second color in the page memory 45 by referring to the color information stored in the second color storage area 43 in a step S210. If the high-order bit is "0", then the step S210 is skipped, and control jumps from the step S200 to a step S220.

The character shape (including the fill and the outline) used in the steps S180, S190 is based on the font data stored in the font memory 34. The size of the character shape is set to the character size that is specified at the time. In this manner, the desired character shape is drawn in one of the methods or patterns shown in FIGS. 3A, 3B, and 3C in the page memory 45. In the step S220, the cursor position in the page memory 45 is updated for the drawing of a next character. Then, control goes back to the step S100.

If the print data are a control code in the step S170, then a step S230 executes other processing indicated by the control code. For example, line feed, page break, positioning of the cursor, etc. may be effected according to respective control codes. When a page break command is read, the printing engine 50 prints characters based on one page of character data stored in the page memory 45 with the given font data. After the step S230, control goes back to the step S100. The print control routine shown in FIG. 4 is repeated until the power supply of the printer 1 is turned off.

As described above, the fill X for a character is drawn with the first color, and the outline Y for a character is drawn with the second color. Therefore, once the first and second colors are established, desired characters can subsequently be drawn with those colors simply by specifying those characters. Specifically, after the first and second colors have been established, desired characters are drawn with the colors simply by receiving character data successively. Therefore, it is not necessary to establish colors twice on a character basis and specify a character twice each time the filled outline character is to be drawn, as with the conventional printers. As a consequence, the time required for the host computer H to transmit data is reduced, resulting in a reduction in the print waiting time after the start of data transmission from the host computer until the characters are actually printed. The printer can thus operate highly efficiently for the user, allowing the user to utilize filled output characters with desired colors, which make printed documents highly attractive in appearance. While the preferred embodiment of the present invention has been described above, the present invention is not limited to the illustrated embodiment, but many changes or modifications may be made therein without departing from the scope of the invention. For example, two character shapes V, W as shown in FIGS. 5A and 5B may be drawn with different colors, respectively, rather than filled outline characters. Although colors are established with commands from the host computer H in the illustrated embodiment, the printer 1 may have color setting buttons so that the user can establish desired colors using such color setting buttons on the printer 1.

As described above, since a first character shape is drawn with a first color and a second character shape is drawn with a second color on the printer according to the present invention, it is not necessary to repeat the setting of colors for each character. After the first and second colors have once been established, desired characters can be drawn with the colors simply by receiving corresponding character data successively. As a result, the time required for the host computer to transmit data for printing each character with two colors is reduced, resulting in a reduction in the print waiting time. The printer can thus operate highly efficiently for the user.

What is claimed is:

1. A printer comprising:
   print data inputting means for receiving print data specifying at least a character;
   shape memory means for storing first and second character shapes for the character, the first and second character shapes being correlated to each other;
   shape reading means for reading the first and second character shapes for the character specified by the print data out of said shape memory means;
   first color storage means for storing a first color;
   second color storage means for storing a second color;
   first drawing data generating means for generating first drawing data indicative of the first character shape drawn with the first color stored in said first color storage means;
   second drawing data generating means for generating second drawing data indicative of the second character shape drawn with the second color stored in said second color storage means; and
   print control means for printing the character on a recording medium based on at least one of said first drawing data and said second drawing data.

2. The printer according to claim 1, further comprising drawing instruction storage means for storing drawing instruction data indicative of an instruction of a selection of at least one of the first and second colors, and wherein said first drawing data generating means generates the first drawing data when the drawing instruction indicates to draw the first color, and said second drawing data generating means generates the second drawing data when the drawing instruction indicates to draw the second color.

3. The printer according to claim 2, wherein said drawing instruction storage means is operatively connected to said print control means so that when said print data inputting means receives print data indicative of a first command specifying a drawing method, said print control means is controlled by said print control means so as to stores the drawing instruction data in said drawing instruction storage means in response to the print data indicative of the first command.

4. The printer according to claim 1, wherein said first color storage means is operatively connected to said print control means so that when said print data inputting means receives print data indicative of a second command for specifying the first color, said first color storage means is controlled by said print control means so as to store the first color.

5. The printer according to claim 4, wherein said second color storage means is operatively connected to said print control means so that when said print data inputting means receives print data indicative of a third command for specifying the second color, said second color storage means is controlled by said print control means so as to store the first color.

6. The printer according to claim 1, further comprising color setting means for setting the first and second colors, and wherein said first and second color storage means are operatively connected to said color setting means for storing the first and second colors, respectively.

7. The printer according to claim 1, wherein the first character shape is an outline of the character, and the second character shape is an inner portion defined by the outline of the character.

8. The printer according to claim 7, wherein said shape memory means stores formulae for calculating the outline of the character based on the print data.

* * * * *